US012637197B2

(12) United States Patent
Buchet

(10) Patent No.: US 12,637,197 B2
(45) Date of Patent: May 26, 2026

(54) LIFTING ASSEMBLY FOR AN AIRCRAFT DOOR

(71) Applicant: Rohr, Inc., Chula Vista, CA (US)

(72) Inventor: Damien Buchet, Toulouse (FR)

(73) Assignee: Rohr, Inc., Chula Vista, CA (US)

( * ) Notice: Subject to any disclaimer, the term of this patent is extended or adjusted under 35 U.S.C. 154(b) by 63 days.

(21) Appl. No.: 18/417,014

(22) Filed: Jan. 19, 2024

(65) Prior Publication Data

US 2024/0247528 A1     Jul. 25, 2024

Related U.S. Application Data

(60) Provisional application No. 63/440,021, filed on Jan. 19, 2023.

(51) Int. Cl.
B64C 1/14        (2006.01)

(52) U.S. Cl.
CPC ............ B64C 1/1407 (2013.01); B64C 1/143 (2013.01); *E05Y 2201/638* (2013.01)

(58) Field of Classification Search
CPC .. B64C 1/1407; B64C 1/143; E05Y 2201/638
See application file for complete search history.

(56) References Cited

U.S. PATENT DOCUMENTS

| | | | | |
|---|---|---|---|---|
| 4,383,347 A | * | 5/1983 | La Conte | .............. E05F 1/1292 |
| | | | | 16/370 |
| 4,720,065 A | * | 1/1988 | Hamatani | ............... B64C 1/143 |
| | | | | 244/905 |

| | | | | |
|---|---|---|---|---|
| 4,854,010 A | * | 8/1989 | Maraghe | ................... E05D 3/18 |
| | | | | 49/248 |
| 5,156,359 A | | 10/1992 | Noble | |
| 5,289,615 A | | 3/1994 | Banks | |
| 5,305,969 A | | 4/1994 | Odell | |
| 5,636,814 A | | 6/1997 | Rollert | |
| 6,293,495 B1 | * | 9/2001 | Aten | ......................... F02K 1/70 |
| | | | | 244/110 B |

(Continued)

OTHER PUBLICATIONS

EP Search Report for EP Patent Application No. 24152937.9 dated Jun. 14, 2024.

*Primary Examiner* — Joshua J Michener
*Assistant Examiner* — Cindi M Curry
(74) *Attorney, Agent, or Firm* — Getz Balich LLC

(57)        ABSTRACT

A door assembly for an aircraft includes a door, a door handle, a door hinge, a support assembly, and a lifting assembly. The door handle is rotatable between an unlatched position and a latched position. The support assembly rotatably mounts the door hinge to the door. The lifting assembly includes a latch cam, a lift track, and a latch idler. The latch cam is mounted to the door handle. The latch cam is rotatable with the door handle about the door handle rotational axis. The latch cam forms an eccentric roller path extending about the door handle rotational axis. The latch idler includes a first roller and a second roller. The first roller is disposed on a lift track of the support assembly and configured to roll along the lift track. The second roller is disposed within the eccentric roller path. The latch idler is mounted to the door. The latch idler is configured to lift the door as the door handle rotates from the latched position to the unlatched position.

15 Claims, 9 Drawing Sheets

(56)  References Cited

U.S. PATENT DOCUMENTS

| | | | | |
|---|---|---|---|---|
| 7,883,058 | B2 * | 2/2011 | Erben | ........................ B64C 1/14 |
| | | | | 49/248 |
| 9,752,358 | B2 | 9/2017 | Powell | |
| 11,066,864 | B2 * | 7/2021 | Bessettes | ................ E05F 11/54 |
| 2006/0202087 | A1 * | 9/2006 | Mortland | .............. B64C 1/1407 |
| | | | | 244/129.5 |
| 2019/0210738 | A1 * | 7/2019 | Arany-Kovacs | ...... B64C 1/1407 |
| 2021/0070416 | A1 | 3/2021 | Buchet | |
| 2022/0412132 | A1 * | 12/2022 | Dubosc | ................... B64C 1/143 |

* cited by examiner

LIFTING ASSEMBLY FOR AN AIRCRAFT DOOR

This application claims priority to U.S. patent application Ser. No. 63/440,021 filed Jan. 19, 2023 which is hereby incorporated herein by reference in its entirety.

BACKGROUND

1. Technical Field

This disclosure relates generally to an aircraft door assembly and, more particularly, to a support assembly for guiding and supporting an aircraft door.

2. Background Information

Aircraft doors, such as passenger doors for an aircraft cabin, may be configured to facilitate evacuation of the aircraft in an emergency. Various assemblies for guiding and supporting aircraft doors for a range of opening and closing movements are known in the art. While these known assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to another aspect of the present disclosure, a door assembly for an aircraft includes a door, a door handle for the door, a door hinge, a support assembly, and a lifting assembly. The door handle is rotatable about a door handle rotational axis between an unlatched position and a latched position. The support assembly rotatably mounts the door hinge to the door. The support assembly includes a forearm. The forearm is rotatably mounted to the door hinge along a first rotational axis. The forearm includes a shaft and a base. The shaft extends along the first rotational axis between and to an upper end and a lower end. The base is disposed at the lower end. The lifting assembly includes a latch cam, a lift track, and a latch idler. The latch cam is mounted to the door handle. The latch cam is rotatable with the door handle about the door handle rotational axis. The latch cam forms an eccentric roller path extending about the door handle rotational axis. The lift track is disposed at the base. The latch idler includes a first roller and a second roller. The first roller is disposed on the lift track and configured to roll along the lift track. The second roller is disposed within the eccentric roller path. The latch idler is mounted to the door. The latch idler is configured to lift the door from a lowered position of the door to a raised position of the door as the door handle rotates from the latched position to the unlatched position.

In any of the aspects or embodiments described above and herein, the latch cam may form a terminal end of the roller path. The second roller may be disposed at the terminal end with the door handle in the unlatched position.

In any of the aspects or embodiments described above and herein, the latch idler may include an idler body having a center axis. The idler body may include a first arm portion and a second arm portion. The first arm portion may extend radially outward from the center axis to a first distal end of the first arm portion. The second arm portion may extend radially outward from the center axis to a second distal end of the second arm portion. The first roller may be rotatably mounted to the first arm portion at the first distal end. The second roller may be rotatably mounted to the second arm portion at the second distal end.

In any of the aspects or embodiments described above and herein, the first distal end may be circumferentially offset from the second distal end relative to the center axis.

In any of the aspects or embodiments described above and herein, the idler body may further include a third arm portion. The third arm portion may extend radially outward from the center axis to a third distal end of the third arm portion. The latch idler may be mounted to the door at the third distal end.

In any of the aspects or embodiments described above and herein, the support assembly may further include a link extending between and to an outer end and an inner end. The link may be rotatably mounted to the door at the outer end. The link may be rotatably mounted to the forearm at the inner end.

In any of the aspects or embodiments described above and herein, the inner end may be rotatably mounted to the shaft at the upper end.

In any of the aspects or embodiments described above and herein, the inner end may be rotatably mounted to the base.

In any of the aspects or embodiments described above and herein, the lift track may extend between and to an upper track end and a lower track end. The upper track end may be disposed vertically above the lower track end. The first roller may be configured to roll along the lift track between and to the lower track end and the upper track end.

In any of the aspects or embodiments described above and herein, the door assembly may further include an emergency puller assist system (EPAS) actuator. The EPAS actuator may extend between and connect the door hinge and the forearm.

In any of the aspects or embodiments described above and herein, the forearm may be configured to rotate about the first rotational axis from a first rotational position to a second rotational position as the door moves from a closed position to an open position.

According to another aspect of the present disclosure, a door assembly for an aircraft includes a door, a door handle for the door, a door hinge, a support assembly, and a lifting assembly. The door handle is rotatable about a door handle rotational axis between an unlatched position and a latched position. The support assembly rotatably mounts the door hinge to the door. The support assembly includes a forearm and a link. The forearm is rotatably mounted to the door hinge along a first rotational axis. The forearm extends along the first rotational axis between and to an upper end and a lower end. The link extends between and to an outer end and an inner end. The link is rotatably mounted to the door at the outer end. The link is rotatably mounted to the forearm at the inner end. The lifting assembly includes a latch cam, a lift track, and a latch idler. The latch cam is mounted to the door handle. The latch cam is rotatable with the door handle about the door handle rotational axis. The latch cam forms a roller path extending about the door handle rotational axis. The lift track is disposed at the forearm. The lift track extends between and to an upper track end and a lower track end. The upper track end is disposed vertically above the lower track end. The latch idler includes a first roller and a second roller. The first roller is disposed on the lift track. The second roller is disposed within the roller path. The latch idler is mounted to the door. The latch idler is configured to lift the door from a lowered position of the door to a raised position of the door as the door handle rotates from the latched position to the unlatched position.

In any of the aspects or embodiments described above and herein, the latch idler may further include an idler body and a link. The link extends between and to an upper link end and a lower link end. The upper link end may be rotatably mounted to the idler body and the lower link end is rotatably mounted to the door.

In any of the aspects or embodiments described above and herein, the forearm may be configured to rotate, relative to the door hinge, about a first rotational axis from a first rotational position to a second rotational position as the door moves from a closed position to an open position.

In any of the aspects or embodiments described above and herein, the link may be rotatable relative to the forearm about a second rotational axis and the link is rotatable about the second rotational axis between and to the lowered position of the door and the raised position of the door.

According to another aspect of the present disclosure, a door assembly for an aircraft includes a door, a door handle for the door, a door hinge, a support assembly, and a lifting assembly. The door handle is rotatable about a door handle rotational axis between an unlatched position and a latched position. The support assembly includes a forearm rotatably mounting the door hinge to the door. The lifting assembly includes a latch cam, a lift track, and a latch idler. The latch cam is mounted to the door handle. The latch cam is rotatable with the door handle about the door handle rotational axis. The latch cam forms an eccentric roller path extending about the door handle rotational axis. The lift track is disposed on the forearm. The latch idler includes an idler body, a first roller, and a second roller. The idler body has a center axis. The idler body includes a first arm portion and a second arm portion. The first arm portion extends radially outward from the center axis to a first distal end of the first arm portion. The second arm portion extends radially outward from the center axis to a second distal end of the second arm portion. The first roller is rotatably mounted to the first arm portion at the first distal end. The first roller is disposed on the lift track. The second roller is rotatably mounted to the second arm portion at the second distal end. The second roller is disposed within the roller path. The idler body is rotatably mounted to the door. The latch idler is configured to lift the door from a lowered position of the door to a raised position of the door as the door handle rotates from the latched position to the unlatched position.

In any of the aspects or embodiments described above and herein, the idler body may further include a third arm portion. The third arm portion may extend radially outward from the center axis to a third distal end of the third arm portion. The latch idler may be rotatably mounted to the door at the third distal end.

In any of the aspects or embodiments described above and herein, the latch idler may further include a link. The link may extend between and to an upper link end and a lower link end. The upper link end may be rotatably mounted to the idler body at the third distal end. The lower link end may be rotatably mounted to the door.

In any of the aspects or embodiments described above and herein, the first distal end, the second distal end, and the third distal end may be circumferentially offset from one another relative to the center axis.

In any of the aspects or embodiments described above and herein, the idler body may rotate about the center axis as the door handle rotates from the latched position to the unlatched position.

The present disclosure, and all its aspects, embodiments and advantages associated therewith will become more readily apparent in view of the detailed description provided below, including the accompanying drawings.

DETAILED DESCRIPTION

Figure 1:
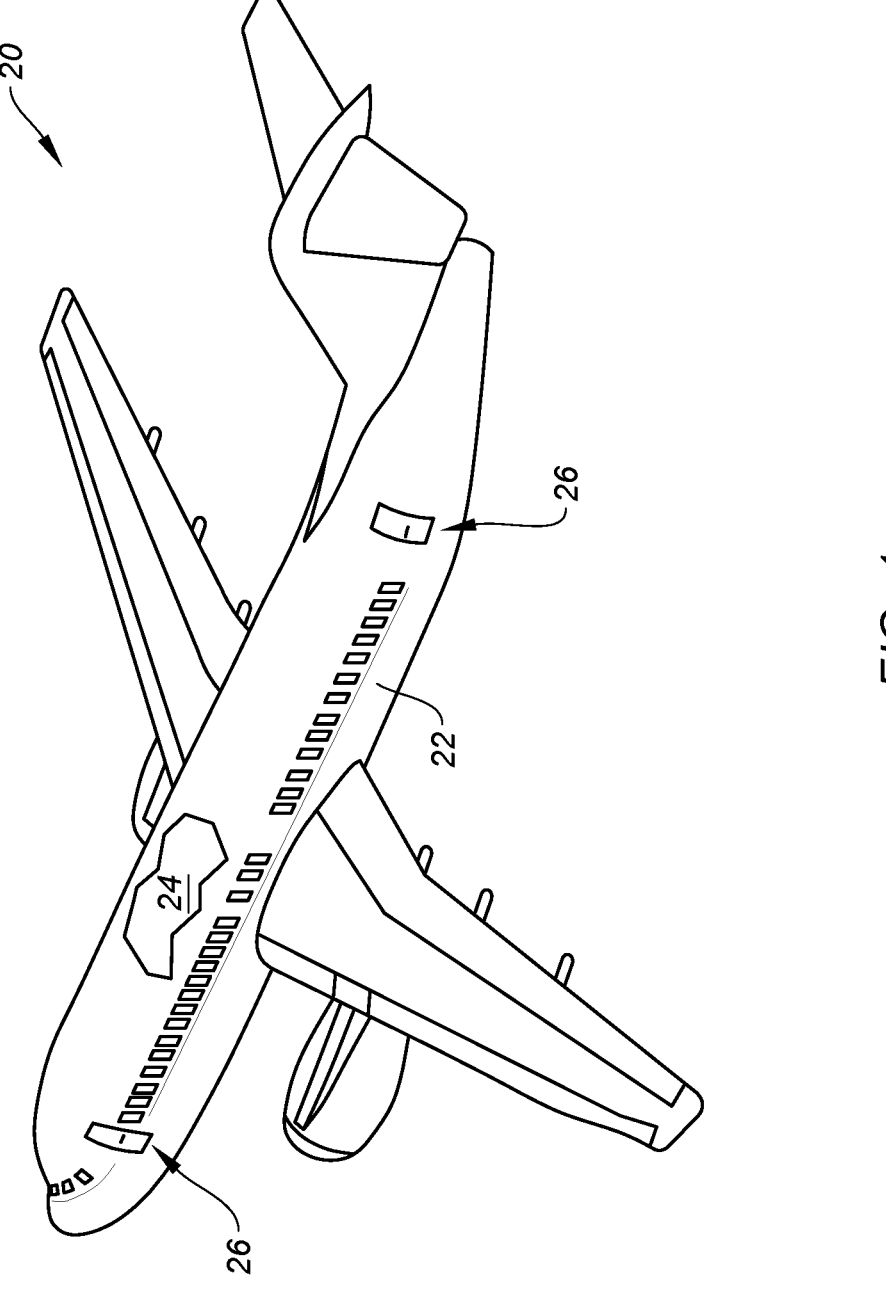
FIG. 1 illustrates a perspective view of an aircraft, in accordance with one or more embodiments of the present disclosure.

FIG. 1 illustrates an aircraft 20 such as an airplane. This aircraft 20 includes a fuselage 22. The fuselage 22 forms and surrounds a cabin 24 (e.g., a passenger cabin, a pressurized compartment, etc.) and other interior compartments (e.g., a cargo bay) of the aircraft 20. The fuselage 22 includes at least one door assembly 26 (e.g., a passenger door assembly, a service door assembly, a cargo door assembly, an emergency exit door assembly, etc.).

Figure 2:
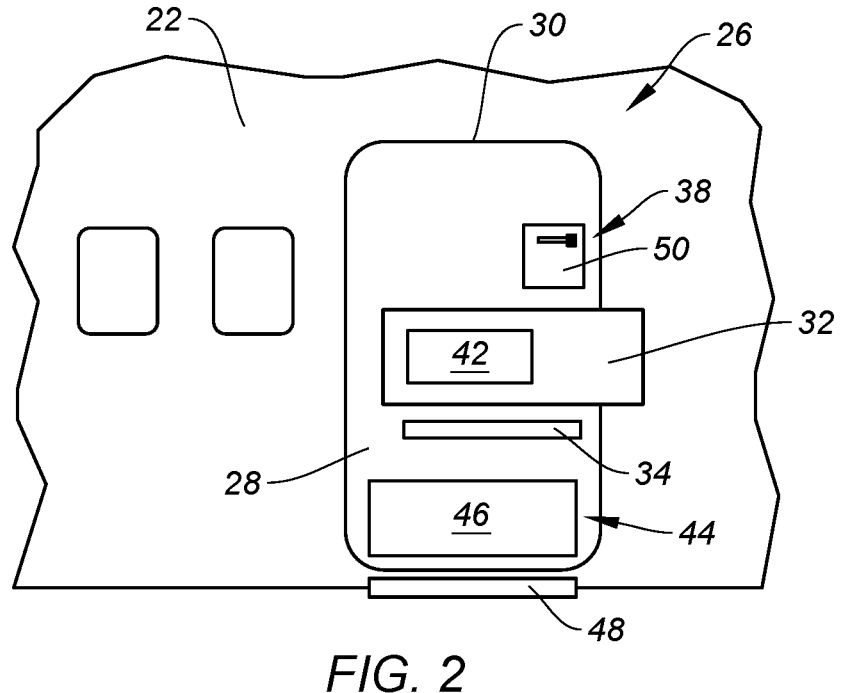
FIG. 2 schematically illustrates an interior of an aircraft door assembly and a surrounding portion of an aircraft fuselage, in accordance with one or more embodiments of the present disclosure.
Figure 3:
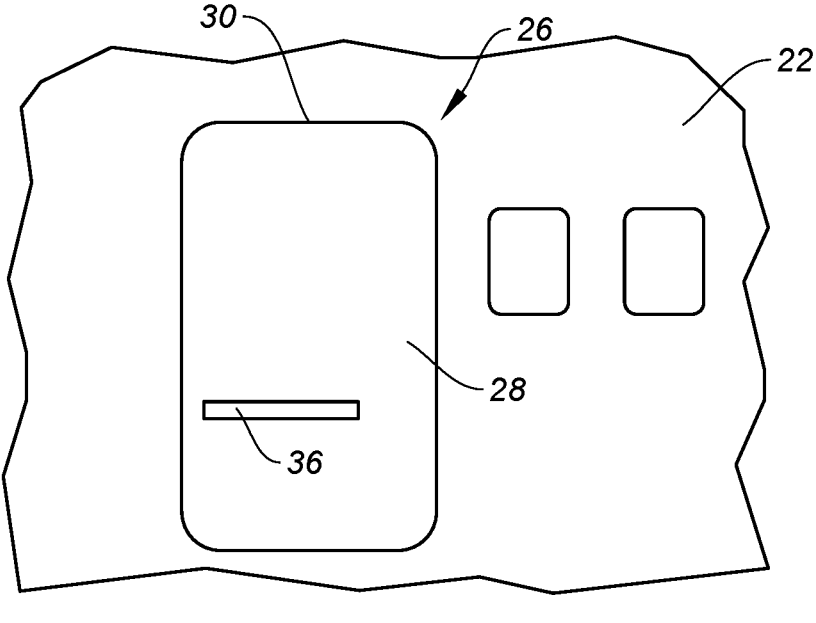
FIG. 3 schematically illustrates an exterior of the aircraft door assembly and a surrounding portion of an aircraft fuselage, in accordance with one or more embodiments of the present disclosure.

Referring to FIGS. 2 and 3, the door assembly 26 includes a door 28, a door frame 30, at least one door hinge 32, an interior door handle 34, an exterior door handle 36, and an emergency support system (ESS) 38. FIG. 2 schematically illustrates an interior view of the door assembly 26. FIG. 3 schematically illustrates an exterior view of the door assembly 26.

Figure 4A:
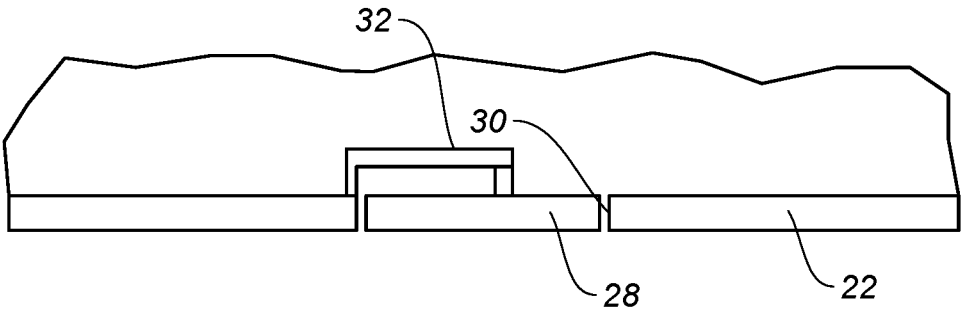
FIGS. 4A-B schematically illustrate the aircraft door assembly with a door in an open position and a closed position, in accordance with one or more embodiments of the present disclosure.
Figure 4B:
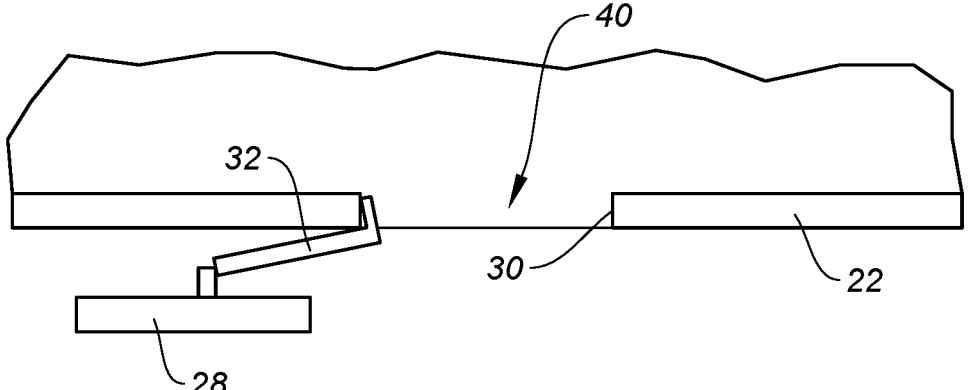

The door 28 is configured to move between a stowed, closed position (see FIG. 4A) and a deployed, open position (see FIG. 4B). For example, during opening of the door 28 of FIGS. 4A and 4B, the door 28 moves away from surrounding, fixed portions of the fuselage 22 and out of the door frame 30. Opening of the door 28 may additionally include an initial lifting motion (e.g., vertically lifting) of the door 28. The door 28 then translates laterally to a side of the door frame 30 to uncover a door opening 40. This door 28 movement is facilitated by the at least one door hinge 32.

The at least one door hinge 32 movable mounts the door 28 to a fixed portion of the fuselage 22.

The door 28 may be opened (or closed) using the interior door handle 34 at an interior of the fuselage 22 and its door 28. The interior door handle 34 is rotatable between and to an unlatched position and a latched position. With the interior door handle 34 in the unlatched position, the door 28 is configured to move from the closed position to the open position. With the interior door handle 34 (and the exterior door handle 36) in the latched position, the door 28 is configured to be securely retained in the closed position (e.g., to seal the pressurized passenger cabin). The door 28 may additionally or alternatively be opened (or closed) using the exterior door handle 36 at an exterior of the fuselage 22 and its door 28. The exterior door handle 36 is rotatable between and to an unlatched position and a latched position. The exterior door handle 36 is rotatable independent of the interior door handle 34. With the exterior door handle 36 in the unlatched position, the door 28 is configured to move from the closed position to the open position. With the exterior door handle 36 (and the interior door handle 34) in the latched position, the door 28 is configured to be securely retained in the closed position (e.g., to seal the pressurized passenger cabin).

The ESS 38 is configured for use during an emergency, for example, to facilitate evacuation of the aircraft 20 using the door assembly 26. The ESS 38 may provide power for moving the door 28 from the closed position to the open position during at least some operating conditions for the door 28. For example, the ESS 38 may include an actuation system 42 (sometimes referred to as an emergency puller assist system (EPAS); e.g., a pneumatic actuation system or an electro-mechanical actuation system) configured to assist a user opening the door 28 in an emergency. The actuation system 42 of FIG. 2 is disposed at (e.g., on, adjacent, or proximate) the at least one door hinge 32. The ESS 38 may include an inflatable slide assembly 44 for the door assembly 26. The inflatable slide assembly 44 may operate in combination with or separately from the actuation system 42. The inflatable slide assembly 44 of FIG. 2 includes an inflatable slide 46 and a girt bar 48. The inflatable slide 46 may be stored within a portion of the door 28 (e.g., a slide bustle) in an undeployed condition. The girt bar 48 of FIG. 2 may be attached to a floor of the aircraft 20 at (e.g., on, adjacent, or proximate) the door 28. The inflatable slide 46 is fixedly attached to the girt bar 48. During at least some operating conditions for the door 28, such as during an emergency opening of the door for which the ESS 38 (e.g., the actuation system 42) may provide power for moving the door 28 from the closed position to the open position, the opening of the door 28 may pull the inflatable slide 46 from the door 28 (e.g., from the slide bustle). The inflatable slide 46 may then be actuated (e.g., inflated) by a compressed gas cylinder or other system for supplying compressed gas to the inflatable slide 46.

Referring to FIGS. 5 and 6A-C, the door assembly 26 further includes a support assembly 50 for the door 28. The support assembly 50 is disposed within the door 28. The support assembly 50 of FIGS. 5 and 6 includes a forearm 52, a lower link 54, an upper link 56, and a lifting assembly 58. The support assembly 50 may further include one or more weight compensation springs 60.

The forearm 52 is a kinematic element disposed on the door hinge 32 to (e.g., primarily) facilitate and manage a pivoting motion of the door hinge 32 and a lifting motion of the door 28 when initially opened. The forearm 52, however, may also be used to facilitate and/or support one or more other functions of the door assembly 26 such as weight compensation, operation of the ESS 38, and/or operation of a door synchronizing mechanism. The forearm 52 includes a single shaft 62 and a base 64. The forearm 52 is mounted to the door hinge 32. For example, the shaft 62 may be rotatably mounted to the door hinge 32 at (e.g., on, adjacent, or proximate) a distal end 66 of the door hinge 32. The forearm 52 may be rotatably mounted to the door hinge 32 by one or more bearings (e.g., ball bearings). The forearm 52 may be rotatable relative to the door hinge 32 about a rotational axis 74. The door hinge 32 and the forearm 52 cooperatively support and guide the door 28 relative to the fuselage 22 (e.g., the door frame 30) as the door 28 is moved between the closed position (see FIG. 4A) and the open position (see FIG. 4B).

The shaft 62 includes a shaft body 68. The shaft body 68 extends between and to a lower end 70 of the shaft body 68 and an upper end 72 of the shaft body 68 along the rotational axis 74. The shaft body 68 may be configured for rotation (e.g., relative to the door hinge 32) about the rotational axis 74. The rotational axis 74 may extend vertically or substantially vertically relative to a typically attitude (e.g., on the ground) of the aircraft 20 (see FIG. 1). The present disclosure, however, is not limited to any particular orientation of the shaft body 68 and its rotational axis 74.

Figure 5:
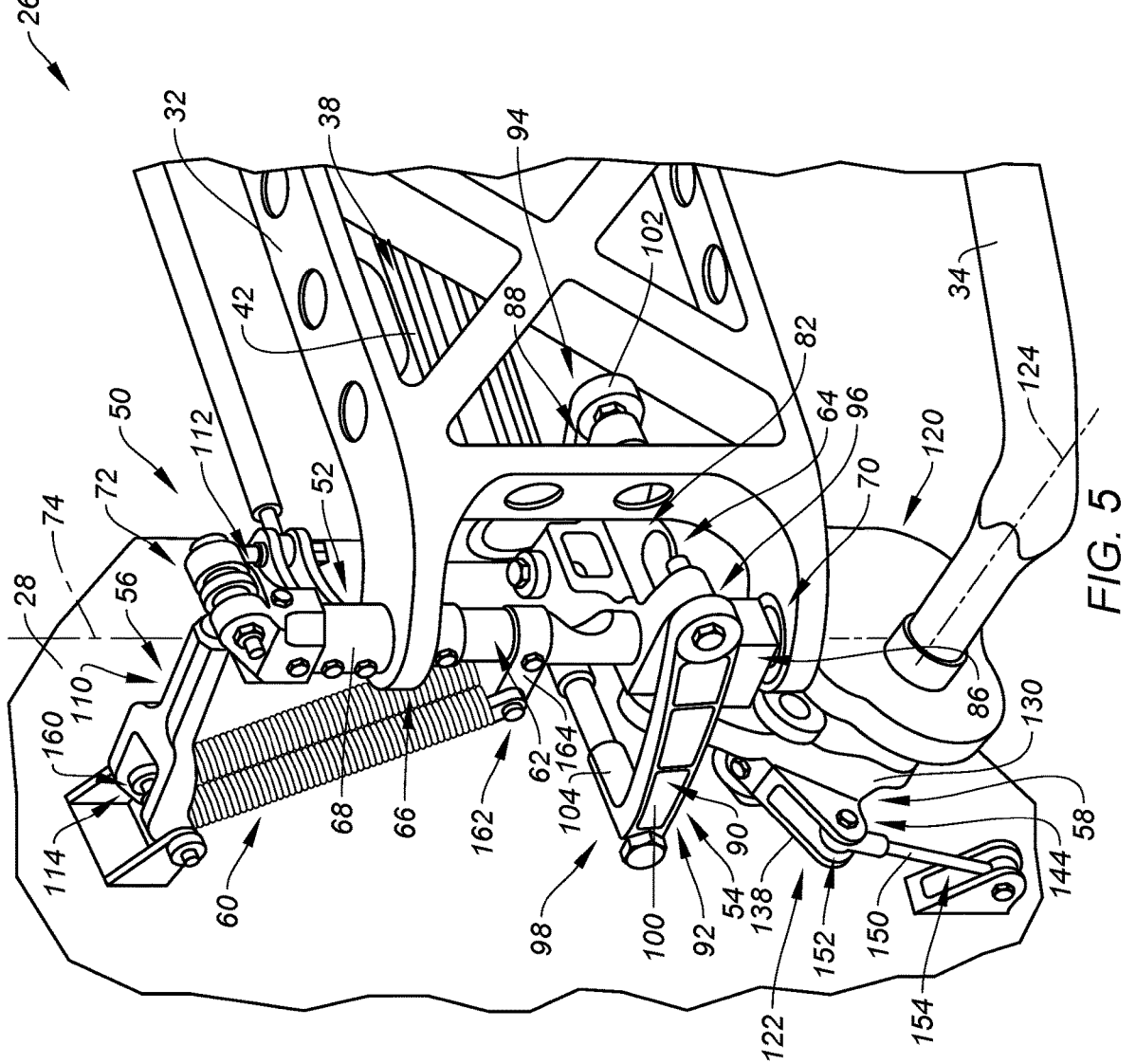
FIG. 5 illustrates a perspective view of a portion of the aircraft door assembly including a support assembly and a lifting assembly, in accordance with one or more embodiments of the present disclosure.

The base 64 is mounted (e.g., fixedly mounted) to or otherwise formed by the shaft body 68. The base 64 of FIGS. 5 and 6 is disposed at (e.g., on, adjacent, or proximate) the lower end 70. However, the present disclosure is not limited to any particular location of the base 64 on the shaft body 68 and/or relative to the rotational axis 74. The base 64 is an enlarged portion of the forearm 52 relative to the shaft body 68. The base 64 extends between and to an inner side 82 of the base 64 and an outer side 84 of the base 64. The base 64 further extends between and to a proximate lateral end 86 of the base 64 and a distal lateral end 88 of the base 64 opposite the proximate lateral end 86. The distal lateral end 88 may be radially farther from the rotational axis 74 than the proximate lateral end 86. The base 68 may be mounted to the actuation system 42. For example, the base 68 may be rotatably mounted to the actuation system 42 radially outward of the shaft body 68 relative to the rotational axis 74, for example, radially between the rotational axis 74 and the distal lateral end 88.

The lower link 54 includes a link body 90. The link body 90 extends between and to a first side 92 of the link body 90 and a second side 94 of the link body 90. The link body 90 extends between and to an inner end 96 of the link body 90 and an outer end 98 of the link body 90. The link body 90 includes a first arm portion 100, a second arm portion 102, and a lateral portion 104. The first arm portion 100 extends from the inner end 96 to the outer end 98 along the first side 92. The second arm portion 102 extends from the inner end 96 to the outer end 98 along the second side 94. The lateral portion 104 extends along the outer end 98. The lateral portion 104 extends between and connects the first arm portion 100 and the second arm portion 102. The link body 90 is rotatably mounted to the forearm 52. For example, the first arm portion 100 and the second arm portion 102 may be rotatably mounted to the base 64 at (e.g., on, adjacent, or proximate) the inner end 96. The first arm portion 100 may be rotatably mounted to the proximate lateral end 86 at (e.g., on, adjacent, or proximate) the inner side 82. The second arm portion 102 may be rotatably mounted to the distal lateral end 88 at (e.g., on, adjacent, or proximate) the inner side 82. The link body 90 may be rotatably mounted to the base 64 at (e.g., on, adjacent, or proximate) a rotational axis 106 (not shown in FIGS. 5 and 6; see FIGS. 8A-B). The rotational axis 106 may extend between and through the proximate lateral end 86 and the distal lateral end 88. The link body 90 is further mounted to the door 28. For example, the firm arm portion 100 and the second arm portion 102 may be rotatably mounted to the door 28 at (e.g., on, adjacent, or proximate) the outer end 98. The link body 90 may be rotatably mounted to the door 28 at (e.g., on, adjacent, or proximate) a rotational axis 108 (not shown in FIGS. 5 and 6; see FIGS. 8A-B). The rotational axis 108 may be parallel to or substantially parallel to the rotational axis 106.

The upper link 56 includes a link body 110. The link body 110 extends between and to an inner end 112 of the link body 110 and an outer end 114 of the link body 110. The link body 110 is rotatably mounted to the forearm 52 at (e.g., on, adjacent, or proximate) the inner end 112. For example, the link body 110 may be rotatably mounted to the shaft 62 (e.g., the upper end 72). The link body 110 may be rotatably mounted to the shaft 62 at (e.g., on, adjacent, or proximate) a rotational axis 116 (not shown in FIGS. 5 and 6; see FIGS. 8A-B). The link body is rotatably mounted to the door 28 at (e.g., on, adjacent, or proximate) the outer end 114. The link body 110 may be rotatably mounted to the door 28 at (e.g., on, adjacent, or proximate) a rotational axis 118 (not shown in FIGS. 5 and 6; see FIGS. 8A-B). The rotational axis 116 may be parallel to or substantially parallel to the rotational axis 118. The rotational axis 116 and/or the rotational axis 118 may be parallel to or substantially parallel to the rotational axis 106 and/or the rotational axis 108.

Referring to FIGS. 5 and 6A-C, the lifting assembly 58 includes a latch cam 120, a latch idler 122, and a lift track 123. The lifting assembly 58 is configured to facilitate lifting and initial opening of the door 28 (see FIGS. 2-5) as well as holding the door 28 in the lifted position as it is moved to the open position (see FIG. 4B).

The latch cam 120 is formed by or otherwise mounted (e.g., fixedly mounted) to the interior door handle 34 and disposed within the door 28. The latch cam 120 is configured for rotation about a door handle rotational axis 124 with the interior door handle 34 as the interior door handle 34 rotates between the latched and unlatched positions. The latch cam 120 forms a roller path 126 (e.g., an eccentric roller path) extending about (e.g., partially around) the door handle rotational axis 124. The latch cam 120 forms a terminal end 128 of the roller path 126 at a circumferential end of the roller path 126, relative to the door handle rotational axis 124.

The latch idler 122 includes an idler body 130 having a center axis 132. The idler body 130 of FIGS. 5 and 6A-C includes, for example, a first arm portion 134, a second arm portion 136, and a third arm portion 138. Each of the first arm portion 134, the second arm portion 136, and the third arm portion 138 extends radially outward from the center axis 132 to a first distal end 140, a second distal end 142, and a third distal end 144, respectively. The first distal end 140, the second distal end 142, and the third distal end 144 are circumferentially offset from one another relative to the center axis 132.

The latch idler 122 of FIGS. 5 and 6A-C further includes a first roller 146, a second roller 148. The latch idler 122 may additionally include a link 150. The first roller 146 is disposed at (e.g., on, adjacent, or proximate) the first distal end 140. The second roller 148 is disposed at (e.g., on, adjacent, or proximate) the second distal end 142. The link 150 extends between and to an upper end 152 of the link 150 and a lower end 154 of the link 150. The upper end 152 is rotatably mounted to the third arm portion 138 at (e.g., on, adjacent, or proximate) the third distal end 144 (link 150 omitted for clarity in FIGS. 6A-C; see FIG. 5).

The lift track 123 of FIGS. 5 and 6A-C is formed by or otherwise mounted to the base 64 at (e.g., on, adjacent, or proximate) the outer side 84. The lift track 123 projects outward from the outer side 84. The lift track 123 extends between and to a lower end 156 of the lift track 123 and an upper end 158 of the lift track 123. The lift track 123 may extend laterally from the lower end 156 to the upper end 158 along the outer side 84. The lower end 156 may be disposed at (e.g., on, adjacent, or proximate) the proximate lateral end 86. The upper end 158 may be disposed at (e.g., on, adjacent, or proximate) the distal lateral end 88. The upper end 158 may be disposed above (e.g., vertically above) the lower end 156.

The first roller 146 is disposed on the lift track 123. The first roller 146 is configured to roll along the lift track 123 between and to the lower end 156 and the upper end 158. The second roller 148 is disposed and constrained within the roller path 126. The second roller 148 is configured to travel within the roller path 126 as the interior door handle 34 and the latch cam 120 rotate about the door handle rotational axis 124 (e.g., between the latched position and the unlatched position). The latch idler 122 is operably connected to the door 28 by the link 150. The link 150 (e.g., the lower end 152) may be mounted (e.g., rotatably mounted) directly to a body of the door 28 or to an intermediate component of the door 28 (e.g., a latch shaft).

The one or more weight compensation springs 60 may extend between and connect the forearm 52 and the upper link 56 to facilitate biasing of the door 28 in the raised position (e.g., by overcoming a portion of a total weight of the door 28). The weight compensation springs 60 extend between and to an upper end 160 of the weight compensation springs 60 and a lower end 162 of the weight compensation springs 60. The upper end 160 may be rotatable mounted to the upper link body 110, for example, at (e.g., on, adjacent, or proximate) the outer end 114. The lower end 162 may be rotatably mounted to the shaft body 68 at (e.g., on, adjacent, or proximate) an intermediate portion of the shaft body 68 between the lower end 70 and the upper end 72. For example, the lower end 162 may be rotatably mounted to the shaft body 68 by a fitting 164 mounted to or otherwise formed by the shaft body 68 at (e.g., on, adjacent, or proximate) a middle of the shaft body 68.

Figure 6A:
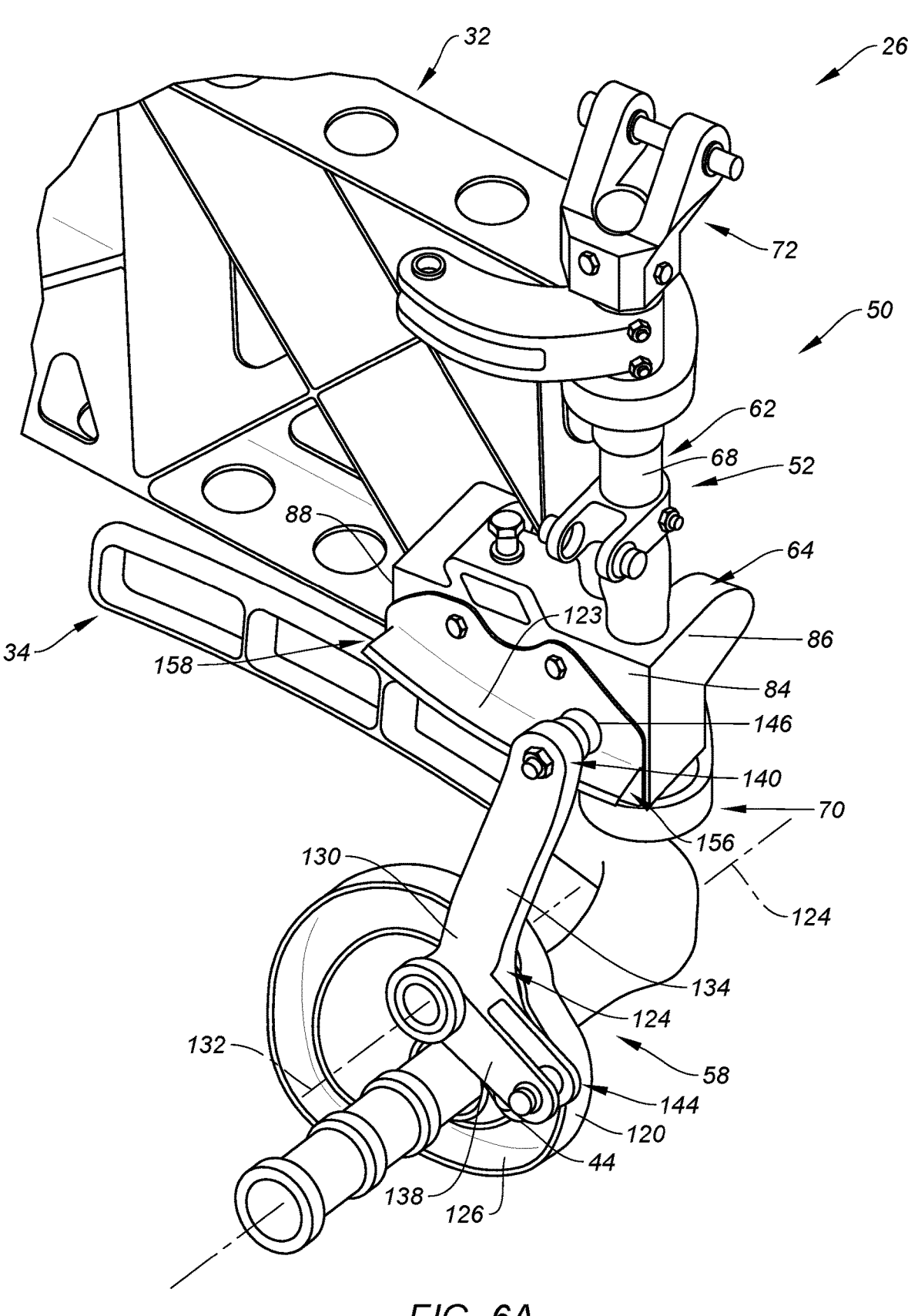
FIGS. 6A-C illustrate perspective views of the lifting assembly of FIG. 5 in a plurality of sequential positions, in accordance with one or more embodiments of the present disclosure.
Figure 6B:
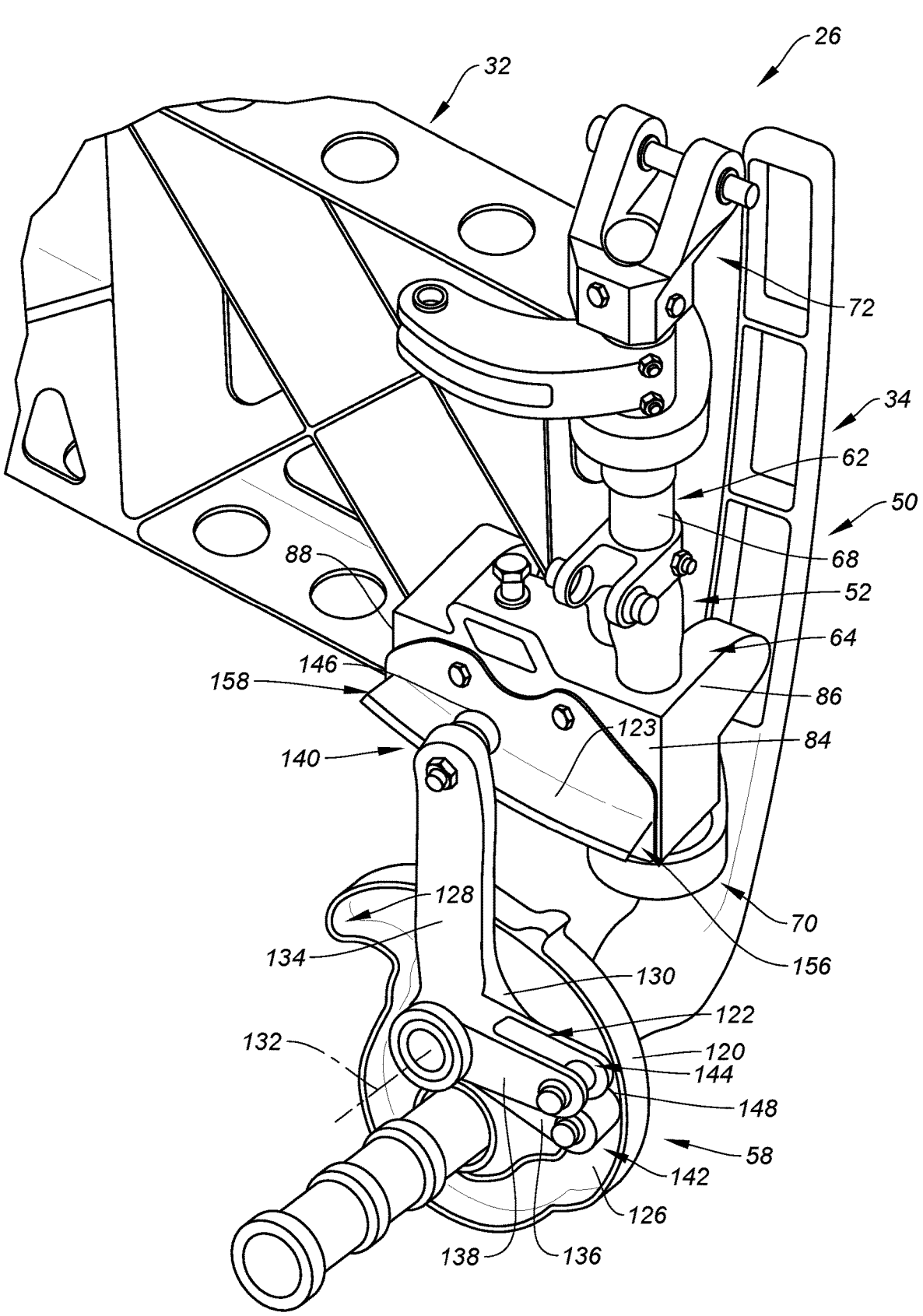
Figure 6C:
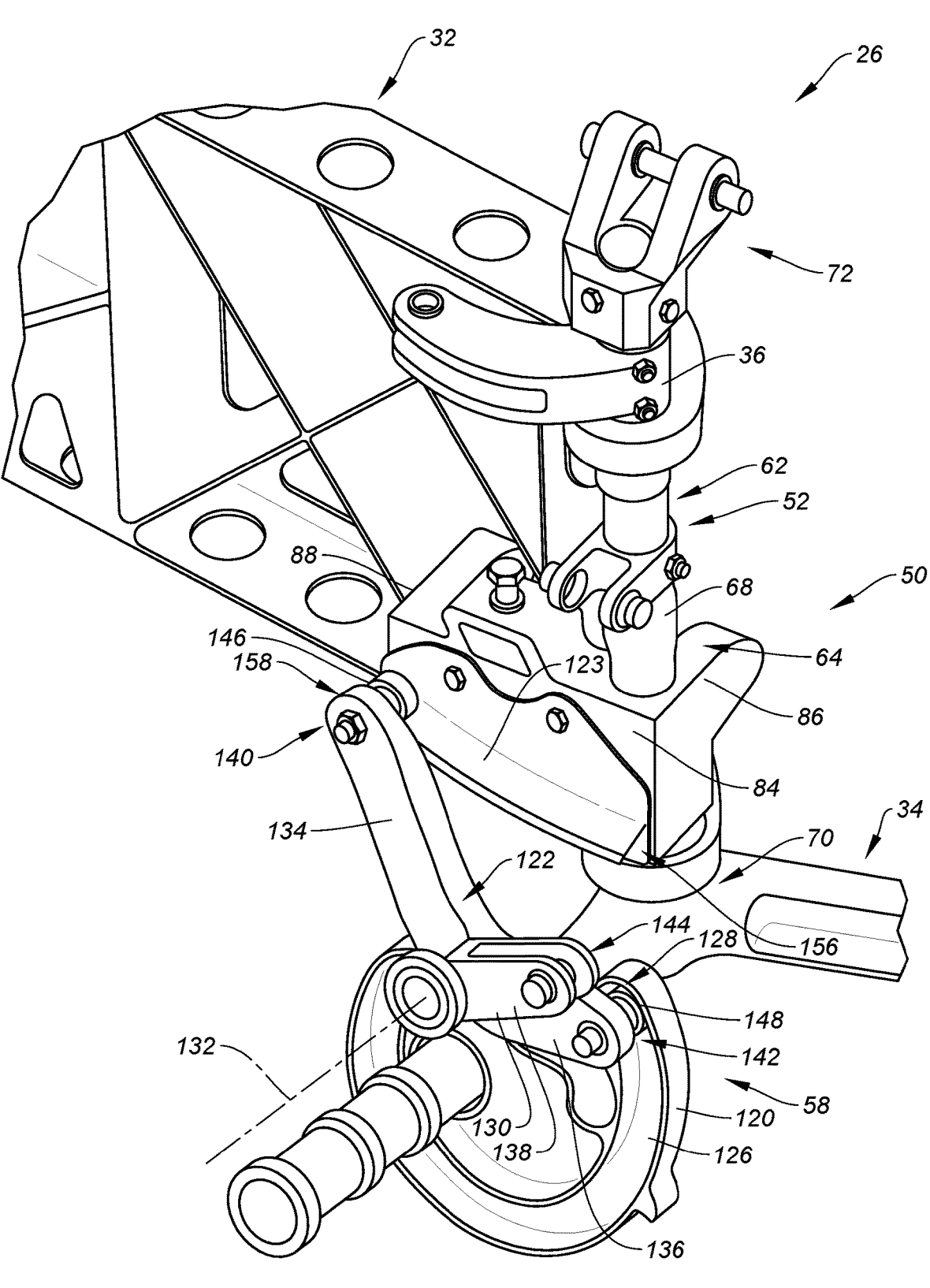

FIGS. 6A-C illustrate sequential movement of the interior door handle 34 and the lifting assembly 58 from a latched position of the interior door handle 34 to an unlatched position of the interior door handle 34. Operation of the interior door handle 34 to move the interior door handle 34 from the latched position to the unlatched position drives rotation of the latch cam 120 (e.g., about the door handle rotational axis 124), thereby causing the latch cam 120 to push the second roller 148 within the roller path 126, thereby driving rotation of the latch idler 122 about the center axis 132. Rotation of the latch idler 122 about the center axis 132 as the interior door handle 34 is moved from the latched position to the unlatched position causes the first roller 146 to roll along the lift track 123 from the lower end 156 to the upper end 158, thereby lifting (e.g., vertically lifting) the door 28, with the latch idler 122, from a lowered position of the door 28 to a raised position of the door 28, respectively, supported by the forearm 52 and the hinge 32. Once the door 28 is in the open position (e.g., a fully open position), the second roller 148 positioned in contact with the terminal end 128 facilitates stability of the door 28 in the open position.

Similarly, operation of the interior door handle 34 from the unlatched position to the latched position causes the first roller 146 to roll along the lift track 123 from the upper end 158 to the lower end 158, thereby lowering (e.g., vertically lowering) the door 28, with the latch idler 122, from a raised position of the door 28 to a lowered position of the door 28, respectively, supported by the forearm 52 and the hinge 32. The latch idler 122 may additionally be operably coupled to the exterior door handle 36 to operate as described above with respect to the interior door handle 34. The present disclosure, however, is not limited to the foregoing exemplary latch idler 122 configuration of FIGS. 5 and 6A-C.

Figure 7B:
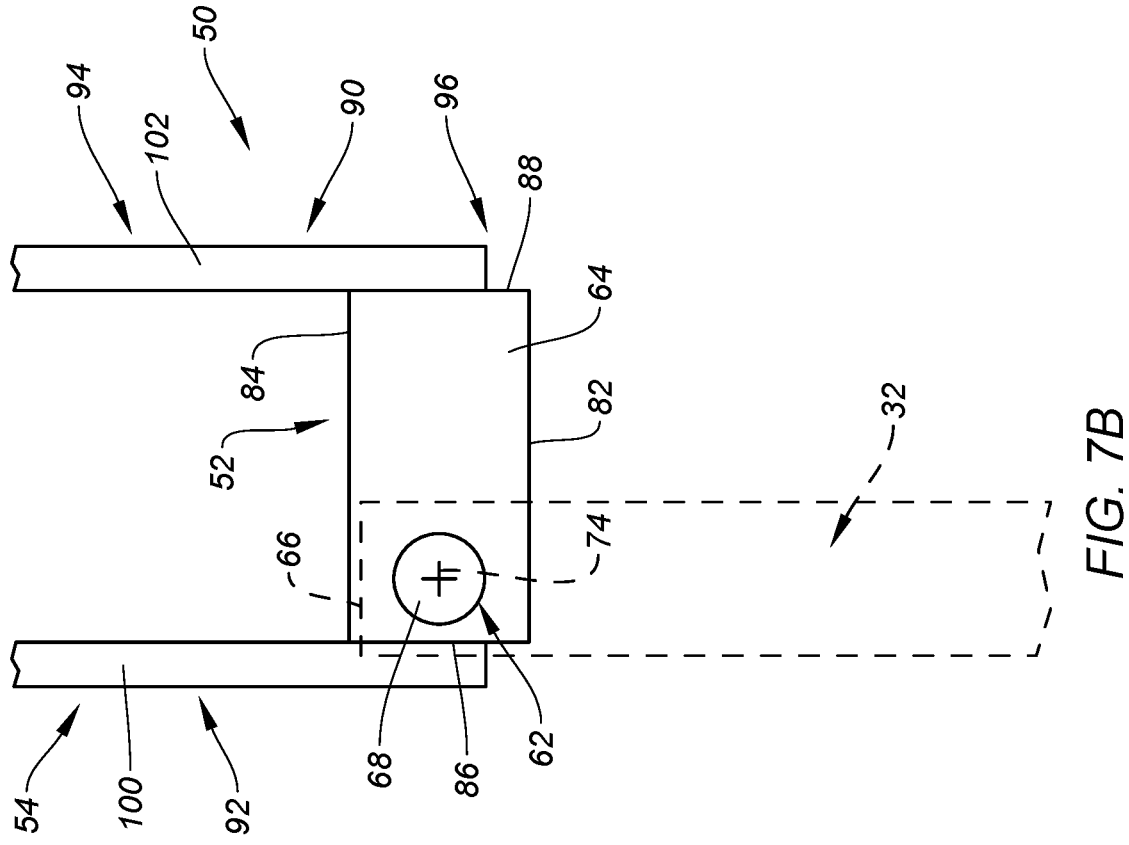
FIGS. 7A-B schematically illustrate various positions of a forearm of the support assembly of FIGS. 5 and 6A-C, in accordance with one or more embodiments of the present disclosure.
Figure 7A:
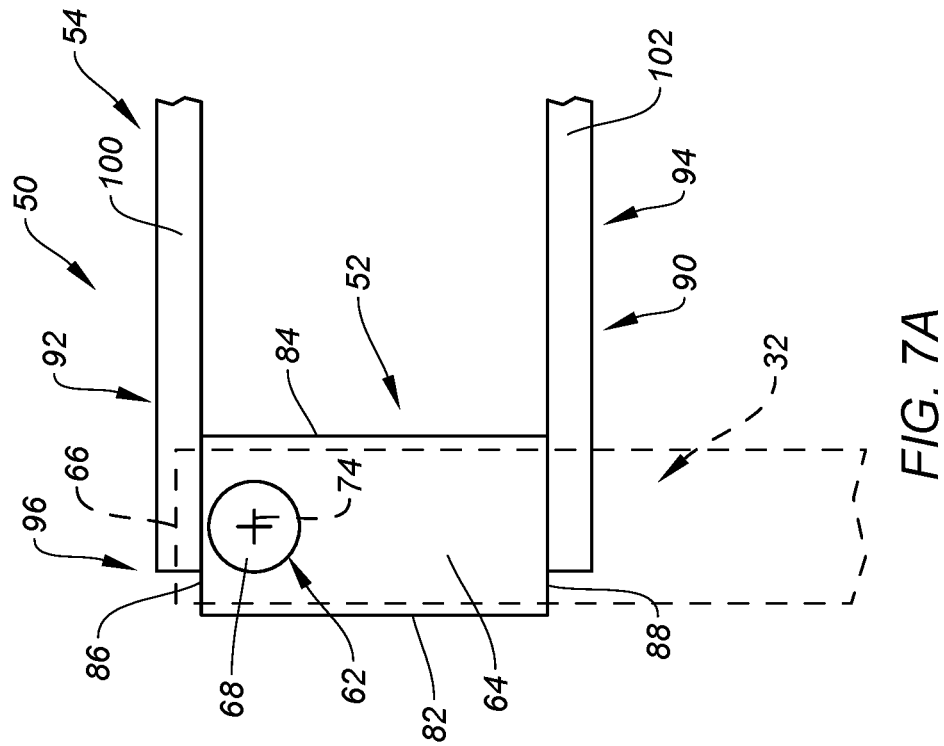
Figure 8B:
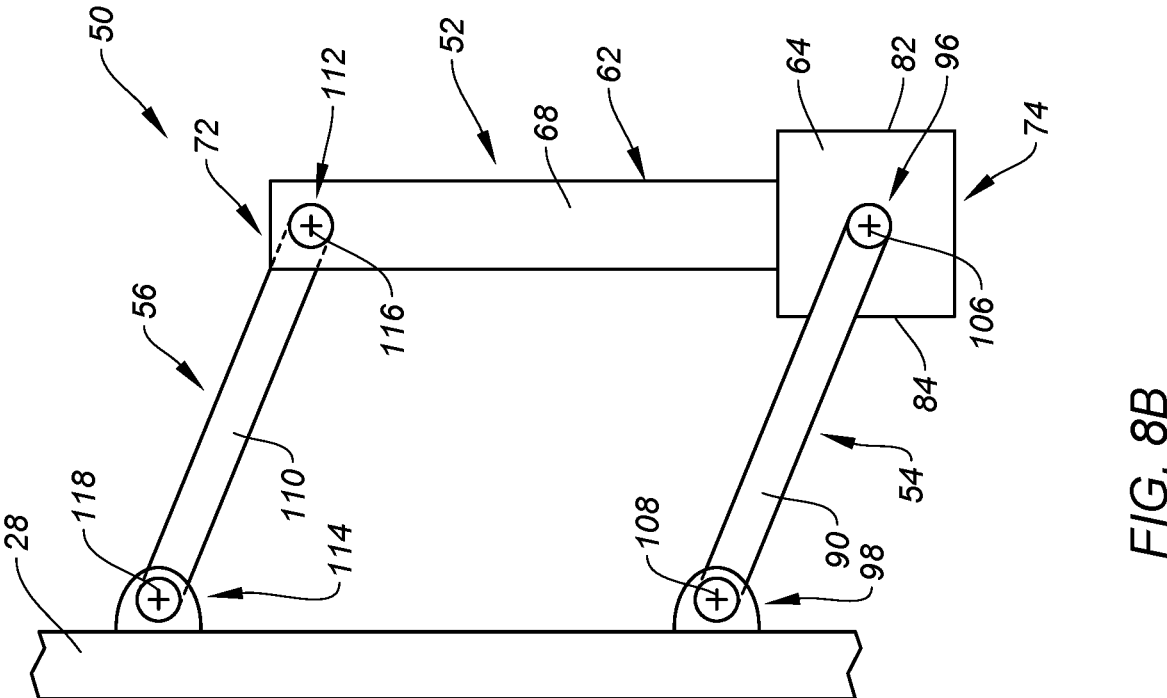
FIGS. 8A-B schematically illustrate various positions of links of the support assembly of FIGS. 5 and 6A-C, in accordance with one or more embodiments of the present disclosure.
Figure 8A:
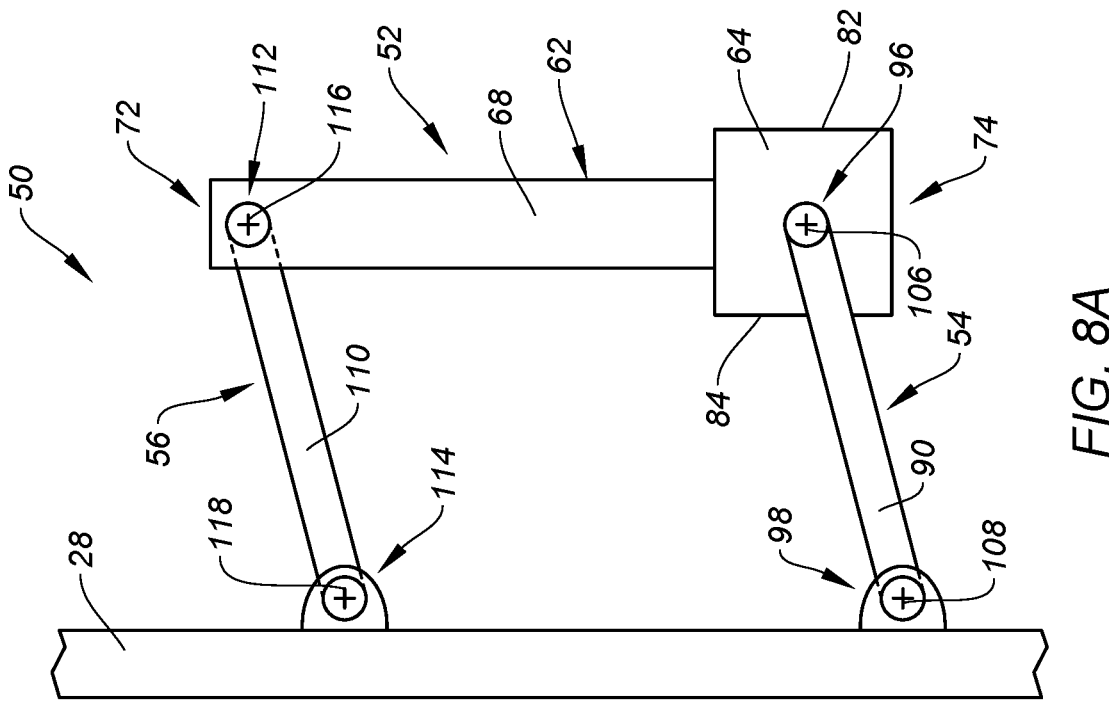

The swiveling motion of the door 28 may be powered by the ESS 38 (e.g., the actuation system 42) connected to the door 28 through the forearm 52 (e.g., the base 64). As shown in FIGS. 7A and 7B, the forearm 52 may rotate from a first rotational position (e.g., with the door 28 in the closed position; see FIG. 7A) to a second rotational position (e.g., with the door in a fully or partially open position; see FIG. 7B) about the rotational axis 74 (see also FIGS. 4A and 4B) as the forearm 52 supports the door 28 during the swiveling motion (e.g., with the lower link 54 and/or the upper link 56). As shown in FIGS. 8A and 8B, the lower link 54 and the upper link 56 may rotate about the rotational axis 106 and the rotational axis 116, respectively, from a lowered position (see FIG. 8A) to a raised position (see FIG. 8B) as the latch idler 122 lifts the door 28, thereby supporting and guiding the vertical movement of the door 28.

The configuration of the support assembly 50 and the lifting assembly 58 may facilitate integration of various functions into a reduced number of parts relative to at least some conventional aircraft door assemblies. The present disclosure may thereby obviate a need for separate aircraft door assemblies and components such as (1) support fittings to attach stabilizer bars on the door structure, (2) support fittings and mechanisms (e.g., with supports) to connect the actuation system 42 (e.g., an EPAS actuator) from the door hinge to the door structure, (3) mechanisms (e.g., with supports) to indirectly manage the door lift function, and/or (4) mechanisms (e.g., with supports) to manage the weight compensation function within door structure.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The terms 'substantially,' 'about,' and other similar terms utilized throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged.

A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A door assembly for an aircraft, the door assembly comprising:
a door;

a door handle for the door, and the door handle is rotatable about a door handle rotational axis between an unlatched position and a latched position;

a door hinge;

a support assembly rotatably mounting the door hinge to the door, the support assembly includes a forearm, the forearm is rotatably mounted to the door hinge along a first rotational axis, the forearm includes a shaft and a base, the shaft extends along the first rotational axis between and to an upper end and a lower end, and the base is disposed at the lower end; and a lifting assembly including a latch cam, a lift track, and a latch idler, the latch cam is mounted to the door handle, the latch cam is rotatable with the door handle about the door handle rotational axis, the latch cam forms an eccentric roller path extending about the door handle rotational axis, the lift track is disposed at the base, the latch idler includes a first roller and a second roller, the first roller is disposed on the lift track and configured to roll along the lift track, the second roller is disposed within the eccentric roller path, the latch idler is mounted to the door, the latch idler is configured to lift the door from a lowered position of the door to a raised position of the door as the door handle rotates from the latched position to the unlatched position.

2. The door assembly of claim 1, wherein the latch cam forms a terminal end of the roller path, and the second roller is disposed at the terminal end with the door handle in the unlatched position.

3. The door assembly of claim 1, wherein the latch idler includes an idler body having a center axis, the idler body includes a first arm portion and a second arm portion, the first arm portion extends radially outward from the center axis to a first distal end of the first arm portion, the second arm portion extends radially outward from the center axis to a second distal end of the second arm portion, the first roller is rotatably mounted to the first arm portion at the first distal end, and the second roller is rotatably mounted to the second arm portion at the second distal end.

4. The door assembly of claim 3, wherein the first distal end is circumferentially offset from the second distal end relative to the center axis.

5. The door assembly of claim 3, wherein the idler body further includes a third arm portion, the third arm portion extends radially outward from the center axis to a third distal end of the third arm portion, and the latch idler is mounted to the door at the third distal end.

6. The door assembly of claim 1, wherein the support assembly further includes a link extending between and to an outer end and an inner end, the link is rotatably mounted to the door at the outer end, and the link is rotatably mounted to the forearm at the inner end.

7. The door assembly of claim 6, wherein the inner end is rotatably mounted to the shaft at the upper end.

8. The door assembly of claim 6, wherein the inner end is rotatably mounted to the base.

9. The door assembly of claim 1, wherein the lift track extends between and to an upper track end and a lower track end, the upper track end is disposed vertically above the lower track end, and the first roller is configured to roll along the lift track between and to the lower track end and the upper track end.

10. The door assembly of claim 1, further comprising an emergency puller assist system (EPAS) actuator, and the EPAS actuator extends between and connects the door hinge and the forearm.

11. The door assembly of claim 1, wherein the forearm is configured to rotate about the first rotational axis from a first rotational position to a second rotational position as the door moves from a closed position to an open position.

12. A door assembly for an aircraft, the door assembly comprising:

a door;

a door handle for the door, and the door handle is rotatable about a door handle rotational axis between an unlatched position and a latched position;

a door hinge;

a support assembly including a forearm rotatably mounting the door hinge to the door; and a lifting assembly including a latch cam, a lift track, and a latch idler, the latch cam is mounted to the door handle, the latch cam is rotatable with the door handle about the door handle rotational axis, the latch cam forms an eccentric roller path extending about the door handle rotational axis, the lift track is disposed on the forearm, the latch idler includes an idler body, a first roller, and a second roller, the idler body has a center axis, the idler body includes a first arm portion and a second arm portion, the first arm portion extends radially outward from the center axis to a first distal end of the first arm portion, the second arm portion extends radially outward from the center axis to a second distal end of the second arm portion, the first roller is rotatably mounted to the first arm portion at the first distal end, the first roller is disposed on the lift track, the second roller is rotatably mounted to the second arm portion at the second distal end, the second roller is disposed within the roller path, the idler body is rotatably mounted to the door, the latch idler is configured to lift the door from a lowered position of the door to a raised position of the door as the door handle rotates from the latched position to the unlatched position;

wherein the idler body further includes a third arm portion, the third arm portion extends radially outward from the center axis to a third distal end of the third arm portion, and the latch idler is rotatably mounted to the door at the third distal end.

13. The door assembly of claim 12, wherein the latch idler further includes a link, the link extends between and to an upper link end and a lower link end, the upper link end is rotatably mounted to the idler body at the third distal end, and the lower link end is rotatably mounted to the door.

14. The door assembly of claim 13, wherein the first distal end, the second distal end, and the third distal end are circumferentially offset from one another relative to the center axis.

15. The door assembly of claim 12, wherein the idler body rotates about the center axis as the door handle rotates from the latched position to the unlatched position.

* * * * *